UNITED STATES PATENT OFFICE.

JOHN FARREL, OF NEW YORK, N. Y.

IMPROVEMENT IN FILLING FOR FIRE-PROOF SAFES.

Specification forming part of Letters Patent No. 107,022, dated September 6, 1870.

*To all whom it may concern:*

Be it known that I, JOHN FARREL, of the State, city, and county of New York, have invented a new Composition of Matter for the Filling of Safes, to render them fire-proof; and I do hereby declare that the following is a full, clear, and exact description thereof, reference being had to the accompanying drawing.

This invention relates to the filling usual for rendering safes fire-proof, and the object is to produce a composition which will not corrode the iron of the safe or give out dampness, while combining and maintaining the fire-resisting capacity in a high degree.

My improved fire-proof filling is prepared as follows: Take of calcined gypsum or plaster-of-paris and of hydraulic cement about equal proportions by weight. To these add water of an amount about equal, by weight, to the cement and plaster. The mass being thoroughly stirred is then poured in between the walls of the safe in the usual manner and allowed to "set." The filling thus prepared and used does not, like gypsum, corrode iron nor give off dampness, while the tendency of the cement to swell with the lapse of time counteracts the corresponding liability of the plaster to shrink, producing a filling that is capable of maintaining great uniformity in fire-proof capacity, dryness, and bulk.

In the use of this compound I shall not confine myself to the proportions above named in all cases, but shall vary them as circumstances and experience may determine.

What I claim as my invention, and desire to secure by Letters Patent, is—

The improved fire-proof safe-filling specified, prepared and used substantially as described.

JOHN FARREL.

Witnesses:
 EARLE H. SMITH,
 R. I. HENRY, Jr.